United States Patent
Masutani et al.

(10) Patent No.: US 6,788,960 B2
(45) Date of Patent: Sep. 7, 2004

(54) PORTABLE INFORMATION COMMUNICATION TERMINAL APPARATUS

(75) Inventors: Yutaka Masutani, Yokohama (JP); Michiyoshi Kudo, Yokohama (JP); Hidehiro Yanagibashi, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 392 days.

(21) Appl. No.: 09/980,923

(22) PCT Filed: Feb. 23, 2001

(86) PCT No.: PCT/JP01/01343
§ 371 (c)(1),
(2), (4) Date: Feb. 11, 2002

(87) PCT Pub. No.: WO01/63925
PCT Pub. Date: Aug. 30, 2001

(65) Prior Publication Data
US 2002/0137542 A1 Sep. 26, 2002

(30) Foreign Application Priority Data
Feb. 25, 2000 (JP) .................................. P.2000-50192

(51) Int. Cl.⁷ .................................................. H04B 1/38
(52) U.S. Cl. ................. 455/556.1; 455/90.1; 455/575.1; 348/219
(58) Field of Search ............................ 455/556.1, 90.1, 455/575.1–575.3, 566; 348/222.1, 211.5, 211.14, 375, 373, 219.1, 376

(56) References Cited

U.S. PATENT DOCUMENTS

| | | | |
|---|---|---|---|
| 4,404,595 A | * 9/1983 | Ushiro et al. | 348/375 |
| 5,402,171 A | * 3/1995 | Tagami et al. | 348/219.1 |
| 5,491,507 A | * 2/1996 | Umezawa et al. | 455/556.1 |
| 5,550,754 A | 8/1996 | McNelley et al. | |
| 5,877,811 A | * 3/1999 | Iijima et al. | 348/375 |
| 6,563,534 B1 | * 5/2003 | Shimizu | 348/222.1 |
| 2002/0024611 A1 | * 2/2002 | Watanabe et al. | 348/376 |
| 2002/0077069 A1 | * 6/2002 | Heurtaux | 455/90 |

FOREIGN PATENT DOCUMENTS

| | | |
|---|---|---|
| EP | 0 705 037 A | 4/1996 |
| JP | 11-692214 | 3/1999 |

OTHER PUBLICATIONS

Patent Abstracts of Japan, vol. 1999, No. 10, Aug. 31, 1999 (JP 11–136655 A, May 21, 1999).
Patent Abstracts of Japan, vol. 1998, No. 11, Sep. 30, 1998 (JP 10–155141 A, Jun. 9, 1998).

* cited by examiner

Primary Examiner—Edward F. Urban
Assistant Examiner—Lana Le
(74) Attorney, Agent, or Firm—Pearne & Gordon LLP

(57) ABSTRACT

A portable telephone 1 has a connecting portion 2 as well as a first housing portion 3 and a second housing portion 4 which are connected by the connecting portion 2 in such a manner as to be capable of being folded. An external video camera unit 10 is inserted in a camera-unit attaching portion 6. Various video camera units having different specifications, such as a color video camera unit, a monochromatic video camera unit, a wide-angle video camera unit, and a tele video camera unit, can be attached to or detached from the camera-unit attaching portion 6. The portable information communication terminal 1 is capable of identifying the specifications of the attached video camera unit and of switching over its internal operation in accordance with the specifications.

7 Claims, 7 Drawing Sheets

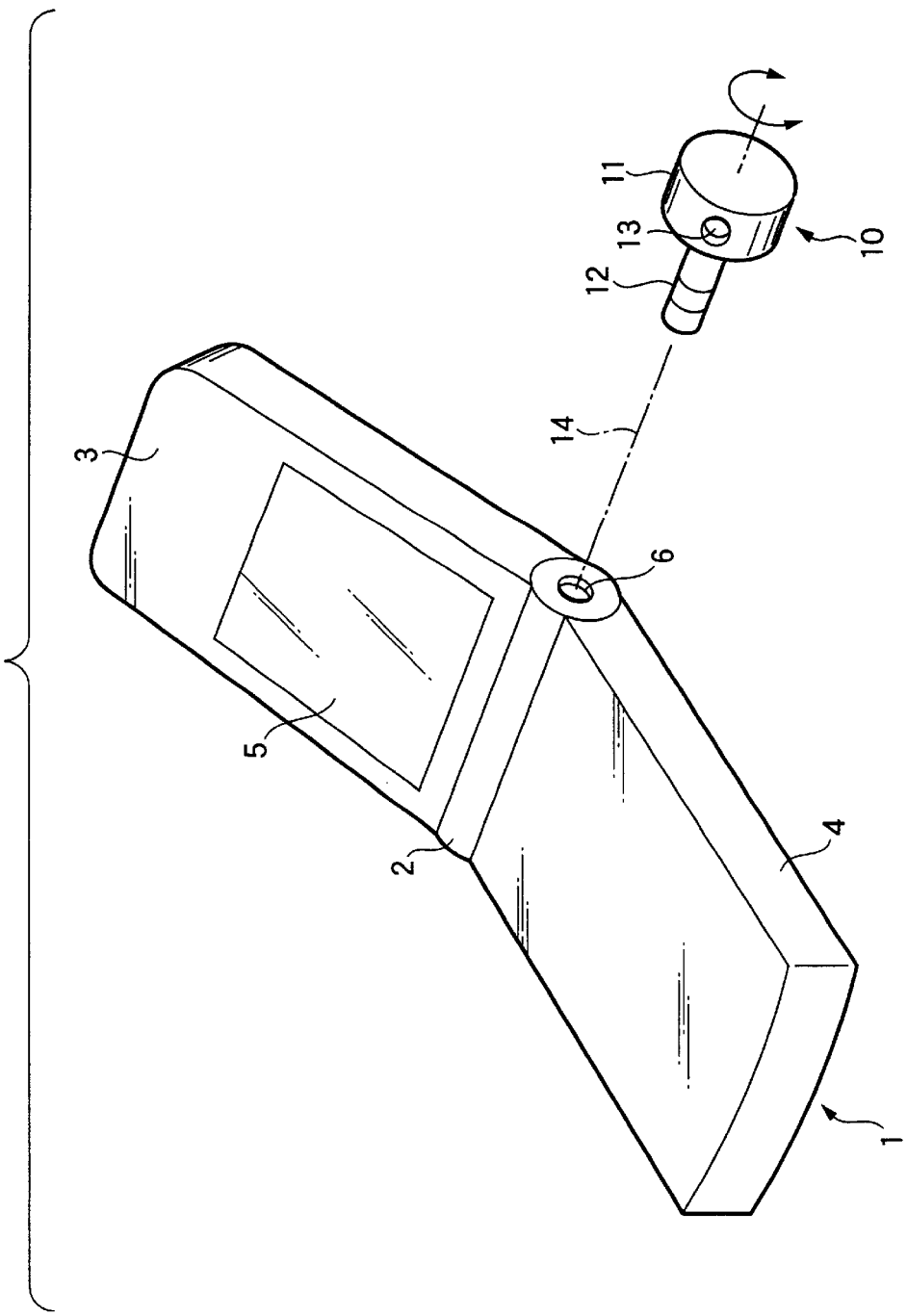

PORTABLE INFORMATION COMMUNICATION TERMINAL APPARATUS

FIELD OF THE INVENTION

The present invention relates to a portable information communication terminal apparatus such as a portable telephone. More particularly, the invention present concerns a portable information communication terminal apparatus to which a plurality of video camera units having different specifications can be selectively attached, and which is capable of switching over its internal operation by identifying the specifications of the attached video camera unit.

BACKGROUND ARTS

Portable telephones are rapidly becoming widespread as progress is made in trends toward the compact size, lower price, and multiple function allowing not only speech but interchange of electronic mail and access to the Internet, for example.

If recording and transmission of images become possible in the portable telephones, the portable telephones will become more convenient. In addition, as a portable telephone capable of recording and transmitting images, an information communication terminal apparatus described in, for example, JP-A-11-69214 is known. In this information communication terminal apparatus, an upper housing and a lower housing are rotatably connected by a connecting portion, and a video camera and a camera lens are accommodated in this connecting portion. According to this information communication terminal apparatus, the recording and transmission of images become possible, and a further multiple function of the portable telephone can be realized.

The video camera and the camera lens in the aforementioned information communication terminal apparatus are accommodated in the connecting portion of the video camera, and are not arranged to be detachable. In addition, consideration has not been given to selectively attaching or detaching a plurality of video cameras having different specifications.

The invention has been devised in view of the above-described circumstances, and its object is to provide a portable information communication terminal apparatus which a plurality of video cameras having different specifications can be selectively attached to or detached from, and which is capable of switching over its internal operation by identifying the specifications of the attached video camera.

DISCLOSURE OF THE INVENTION

The portable information communication terminal apparatus in accordance with the invention is characterized by comprising: a camera-unit attaching portion capable of selectively attaching or detaching a plurality of video camera units having different specifications; identifying means for identifying the specifications of the video camera unit attached to the camera unit attaching portion; and controlling means for changing over internal operation in accordance with a result of identification by the identifying means. By virtue of this configuration, it is possible to selectively attach or detach a plurality of video camera units having different specifications, and change over the internal operation by identifying the specifications of the attached video camera unit.

BRIEF DESCRIPTION OF THE DRAWINGS

FIG. 1 is a diagram for explaining the configuration of a portable telephone in accordance with a first embodiment of the invention;

PREFERRED EMBODIMENTS OF THE INVENTION

Figure 2A:
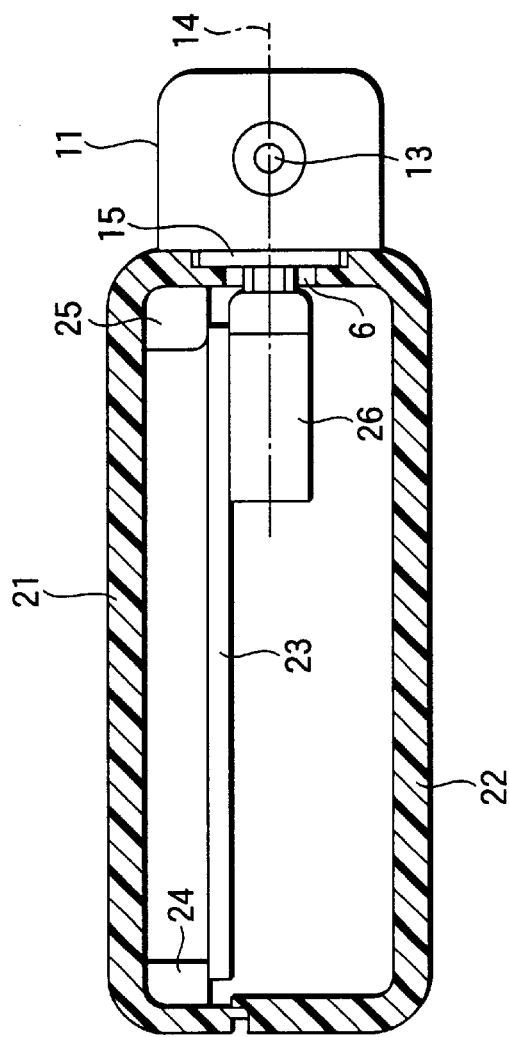
FIGS. 2A and 2B are diagrams for explaining a connecting relationship at a time when an external video camera unit shown in FIG. 1 is attached to a camera-unit attaching portion.

Referring now to the drawings, a description will be given of the embodiments of the invention.
(First Embodiment)

FIG. 1 is a diagram for explaining the configuration of a portable telephone in accordance with a first embodiment of the invention.

This portable telephone 1 has a connecting portion 2 as well as a first housing portion 3 and a second housing portion 4 which are connected by the connecting portion 2 in such a manner as to be capable of being folded. Both the first housing portion 3 and the second housing portion 4 are formed in the shape of a substantially flat rectangular parallelopiped, and a display unit 5, a receiver (not shown), and the like are disposed on the surface of the first housing portion 3. In addition, although not shown, operation keys, a microphone, and the like are disposed on the surface of the second housing portion 4. The connecting portion 2 is formed in a substantially cylindrical shape, and a camera-unit attaching portion 6 is provided at one end thereof. A connector 12 of an external video camera unit 10, which is comprised of a camera body 11 and the connector 12, is inserted in the camera-unit attaching portion 6. The camera body 11 is formed in a substantially cylindrical shape, and accommodates a lens and an imaging device therein, and a light-receiving portion 13 is exposed on its circumferential surface. Since the camera body 11 is arranged to be rotatable about a direction in which it is fitted to the camera-unit attaching portion 6, i.e., about a longitudinal axis 14 of the connecting portion 2, the direction of the light-receiving portion 13 can be tilted over 360 degrees in the angle of elevation. Further, various external video camera units having different specifications, such as a color video camera unit, a monochromatic video camera unit, a wide-angle video camera unit, and a tele video camera unit, can be attached to or detached from the camera-unit attaching portion 6. Thus the portable information communication terminal 1 is so arranged to be able to identify the specifications of the attached video camera and switch over its internal operation in accordance with the specifications. The switching means will be described later.

Figure 2B:
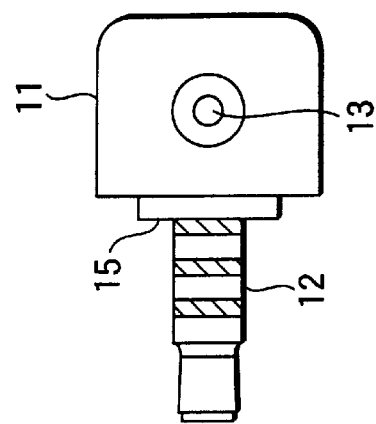

FIGS. 2A and 2B are diagrams for explaining a connecting relationship at the time when the external video camera unit 10 shown in FIG. 1 is attached to the camera-unit attaching portion 6. As shown in FIG. 2A, in the connecting portion 2, a printed circuit board 23 is disposed in an internal space formed by a first member 21 and a second member 22 which engage each other. The printed circuit board 23 is retained by holding ribs 24 and 25 formed integrally with the first member 21. Further, a connector holding portion 26 is disposed at an end portion of the surface of the printed circuit board 23 on the camera-unit attaching portion 6 side. In addition, as shown in FIG. 2B, the connector 12 is provided on one end of the camera body 11 in the external video camera unit 10 in such a manner as to project from a connector proximal portion 15. The connector 12 and the connector holding portion 26 are those which are called a pin plug and a pin jack, respectively. The camera body 11, the connector proximal portion 15, and the connector 12 are formed as a unit, and in the state of being attached to the camera-unit attaching portion 6, the connector 12 is inserted and held in the connector holding portion 26. Additionally, the connector proximal portion 15 abuts against the camera-unit attaching portion 6. Further, the overall external video camera unit 10 is capable of rotating about the longitudinal axis 14 of the connecting portion 2. Here, instead of integrally forming the camera body 11, the connector proximal portion 15, and the connector 12 so as to be rotatable as a unit, a swinging mechanism may be provided between the camera body 11 and the connector proximal portion 15 to allow the camera body 11 to be swingable about ±180 degrees or thereabouts with respect to the connector proximal portion 15.

Figure 3:
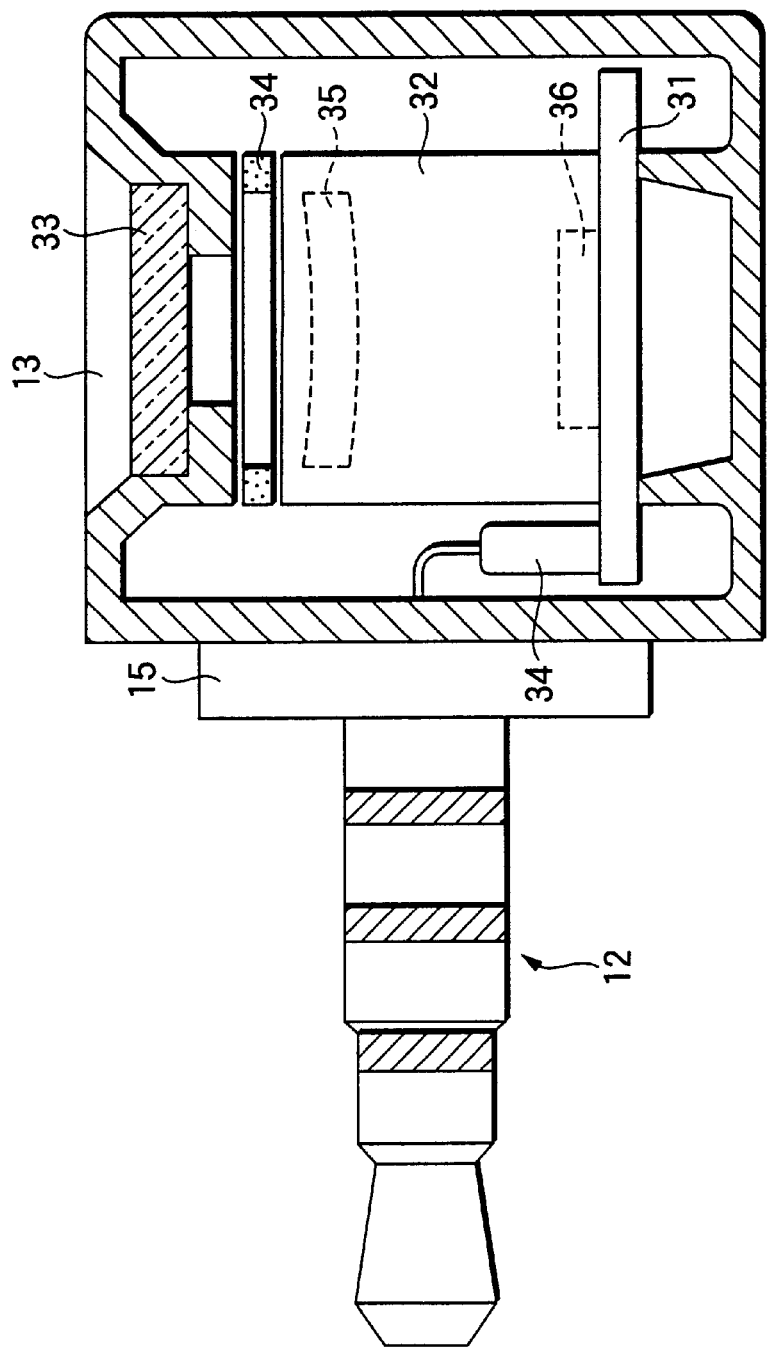
FIG. 3 is a cross-sectional view illustrating the internal structure of a camera body shown in FIG. 1.

FIG. 3 is a cross-sectional view illustrating the internal structure of the camera body 11. A printed circuit board 31 is provided inside the camera body 11, and a camera C-MOS unit 32 is mounted thereon. The connector 12 and the electrical circuitry of the printed circuit board 31 are connected by a circuit board connector 34. A dust-entry preventing cushion 34 is provided on an upper end face of the camera C-MOS unit 32. A disk-shaped transparent resin plate 33 is fixed to the light-receiving portion 13 of the camera body 11. Inside the camera C-MOS unit 32, a lens 35 is disposed on the light-receiving portion 13 side, while a C-MOS imaging device 36 is disposed on the printed circuit board 31 side. Accordingly, the light incident from the light-receiving portion 13 is transmitted through the transparent resin plate 33, is converged by the lens 35, forms an image on the imaging device 36, and is converted to an image signal. Then, the image signal is subjected to predetermined processing by electronic circuits on the printed circuit board 31, and is transmitted to the main body of the portable telephone 1 via the circuit board connector 34 and the connector 12.

Figure 4:
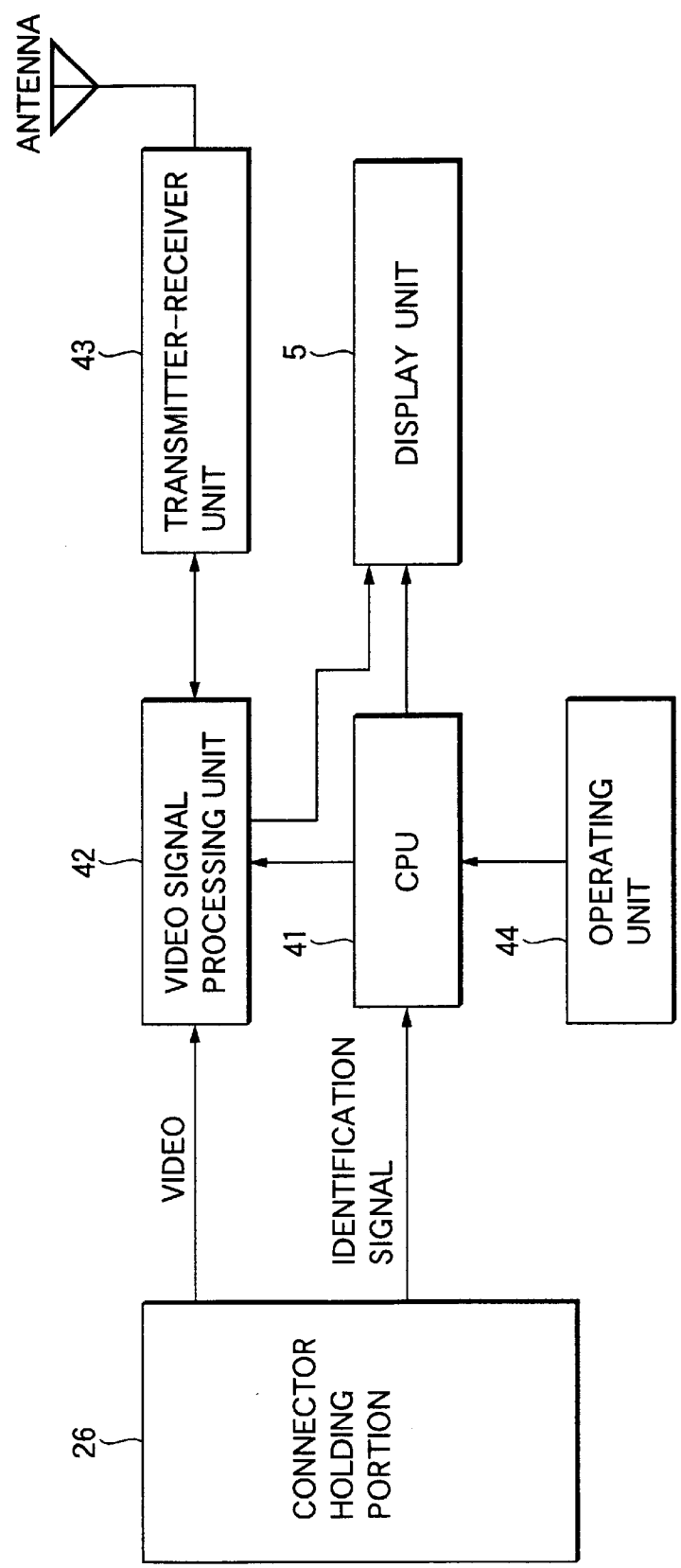
FIG. 4 is a diagram illustrating a portion concerning video signal processing among electronic circuits in a main body of the portable telephone shown in FIG. 1.

FIG. 4 illustrates a portion concerning video signal processing among the electronic circuits in the main body of the portable telephone 1. As shown in FIG. 4, provided inside the portable telephone 1 are the connector holding portion 26 for receiving an electrical signal from the connector 12, a CPU 41 for effecting such as control of the entire terminal apparatus, a video-signal processing circuit 42, a transmitting/receiving unit 43, an operating unit 44, and the display unit 5.

The connector holding portion 26 outputs the video signal received from the connector 12 to the video-signal processing unit 42, and outputs an identification signal received from the connector 12 to the CPU 41. Here, the identification signal is a signal for identifying the specifications of the external video camera unit 10, and is generated inside the camera body 11. The video-signal processing unit 42 subjects the video signal received from the connector holding portion 26 to predetermined display processing, and outputs it to the display unit D. In addition, the video-signal processing unit 42 effects data compression processing and the like and outputs the video signal subjected to such processing to the transmitting/receiving unit 43. Further, the video-signal processing unit 42 receives from the transmitting/receiving unit 43 a video signal transmitted from another portable information communication terminal apparatus having a similar configuration, subjects the video signal to data expansion processing or the like, and outputs it to the display unit 5. The transmitting/receiving unit 43 subjects the video signal received from the video-signal processing unit 42 to modulation, amplification, and other processing, and transmits it to an antenna. In addition, the transmitting/receiving unit 43 subjects the signal received by the antenna to amplification, demodulation, and other processing, and transmits it to the video-signal processing unit 42. In addition, the contents of video signal processing are changed over in response to a control signal transmitted from the CPU 41. The operating unit 44 is an input means for a user to input various commands at the time of using the portable telephone 1.

Figure 5:
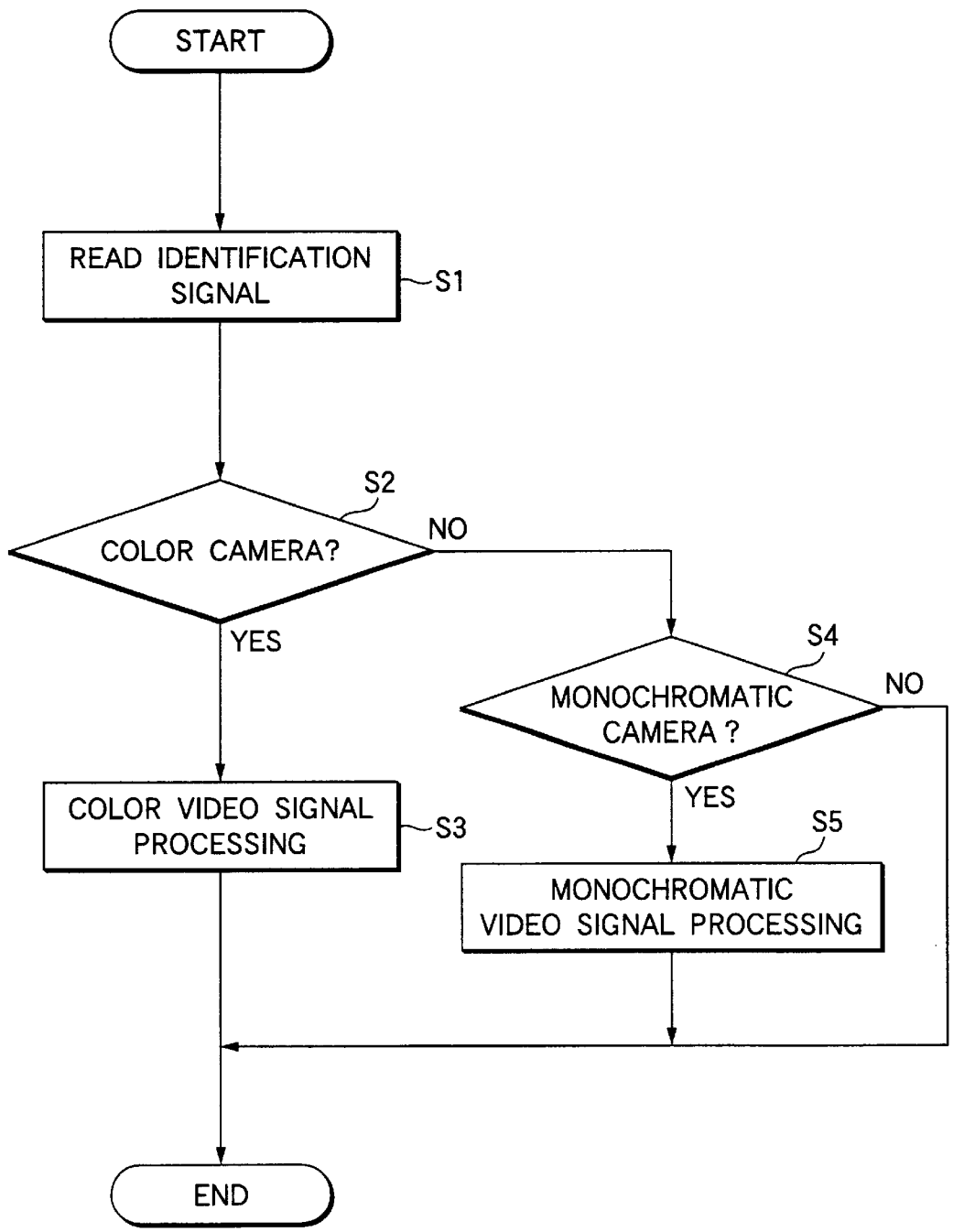
FIG. 5 is a flowchart illustrating an example of the controlling operation of the portable telephone shown in FIG. 1 for changing over the contents of video signal processing in accordance with the specifications of the external video camera unit attached to a camera-unit attaching portion.

Next, referring to the flowchart shown in FIG. 5, a description will be given of an example of the controlling operation of the portable telephone 1 for changing over the contents of video signal processing in accordance with the specifications of the external video camera unit 10 attached to the camera-unit attaching portion 6. Here, a description will be given of a case where a color video camera and a monochromatic video camera can be selectively attached to or detached from the camera-unit attaching portion 6, the portable telephone 1 identifies them, and the contents of video signal processing are changed over.

First, the CPU 41 reads a video camera identification signal (Step S1), and determines whether or not the video camera is the color video camera (Step S2). Then, if a determination is made that it is the color video camera (YES in Step S2), the CPU 41 instructs the video-signal processing unit 42 to perform color video signal processing (Step S3). If a determination is made that it is not the color video camera (NO in Step S2), the CPU 41 determines whether or not the video camera is the monochromatic video camera (Step S4). Then, if a determination is made that it is the monochromatic video camera (YES in Step S4), the CPU 41 instructs the video-signal processing unit 42 to perform monochromatic video signal processing (Step S5). If a determination is made that it is not the monochromatic video camera (NO in Step S4), a determination is made that a proper identification signal has not been fetched, and the processing ends. The foregoing processing is repeated for each fixed time duration.

It should be noted that, in the above-described processing, even if the color video camera, for instance, is attached, in a case where the user has instructed from the operating unit 44 to effect monochromatic processing, control may be provided to place priority on the user's instruction.

In addition, although the above description concerns the case where identification is made between the color video camera and the monochromatic video camera, identification made be made between a wide-angle video camera and a tele video camera, and control may be provided to effect video signal processing corresponding thereto.

Further, when the light-receiving portion 13 of the external video camera unit 10 is facing the reverse surface side of the housing of the portable telephone 1, the top and the bottom of the video camera are reversed when compared with the case where it is facing the front. Accordingly, it is preferable to provide an arrangement to provide top/bottom reversing processing by the video-signal processing unit 42 upon detecting such a situation.

(Second Embodiment)

Figure 6:
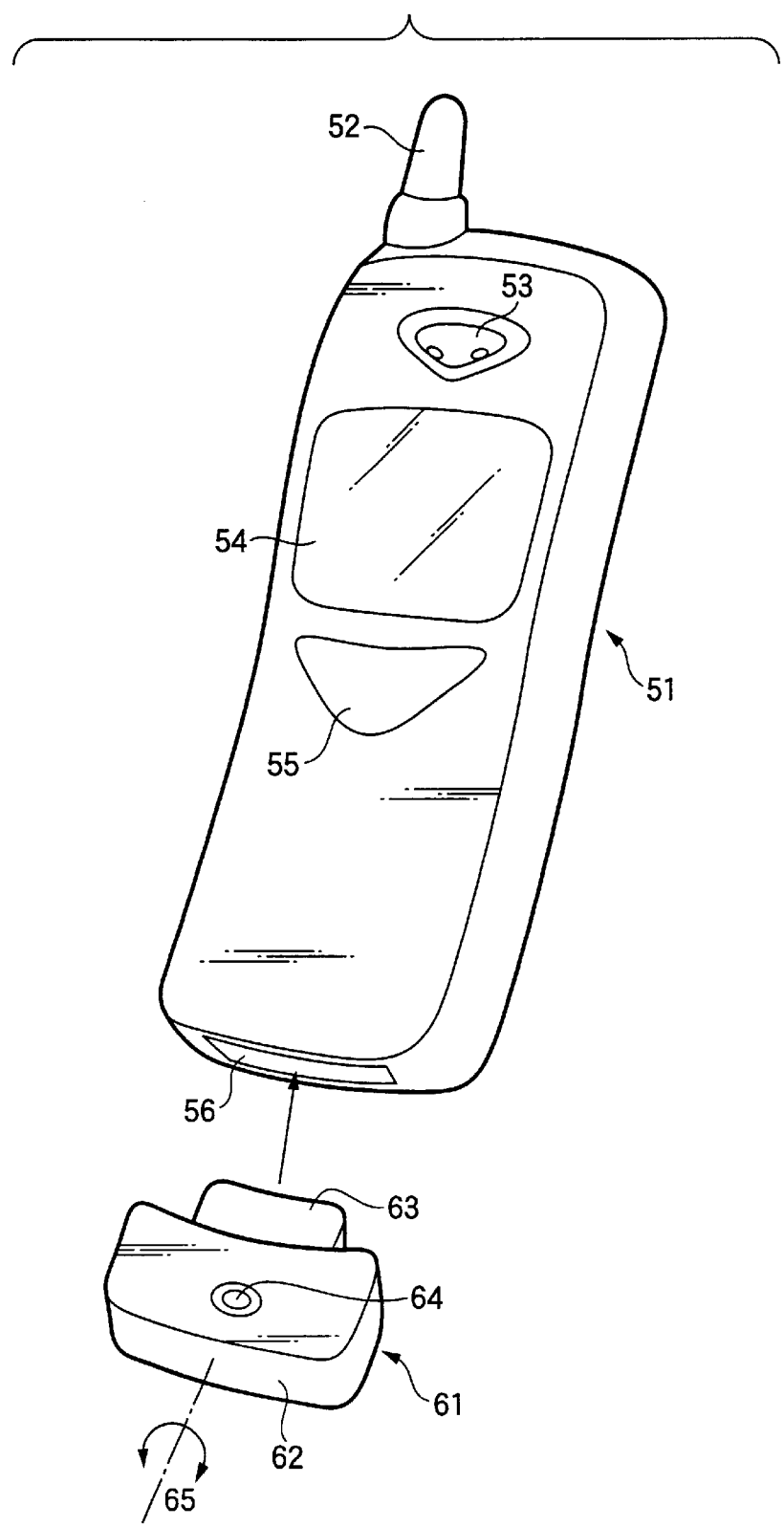
FIG. 6 is a diagram for explaining the configuration of a portable telephone in accordance with a second embodiment of the invention.

FIG. 6 is a diagram for explaining a second embodiment of the invention. This portable telephone 51 has a housing formed in the shape of a substantially flat rectangular parallelopiped, an antenna 52 is disposed at its upper left end portion, and a receiver 53, a display unit 54, and an operating key 55 are disposed in that order from the top on the surface of the housing. Further, an external connection terminal 56 is provided on a lower end face of the housing. The external connection terminal 56 is an input/output terminal for connecting the connector at a time when data communication or the like is effected with an external control apparatus such as a personal computer, or when the portable telephone 51 is charged by a charger. It should be noted that the terminal for data communication may be of a type which effects optical transmission with the connector.

An external video camera unit 61 has an I/O connector 63 which can be attached to or detached from the external connection terminal 56, and as the I/O connector 63 is inserted in the external connection terminal 56, the external video camera unit 61 is mechanically and electrically connected to the portable telephone 51. As for the external video camera unit 61, it is preferable to provide an arrangement in which a camera body 62 is made swingable about an axis 65 of the I/O connector in its fitting direction to allow its light-receiving portion 64 to be able to pan.

Thus, in accordance with the second embodiment of the invention, since the external video camera unit 61 is connected to the external connection terminal, an exclusive member for attaching the external video camera unit 61 is unnecessary.

(Third Embodiment)

Figure 7:
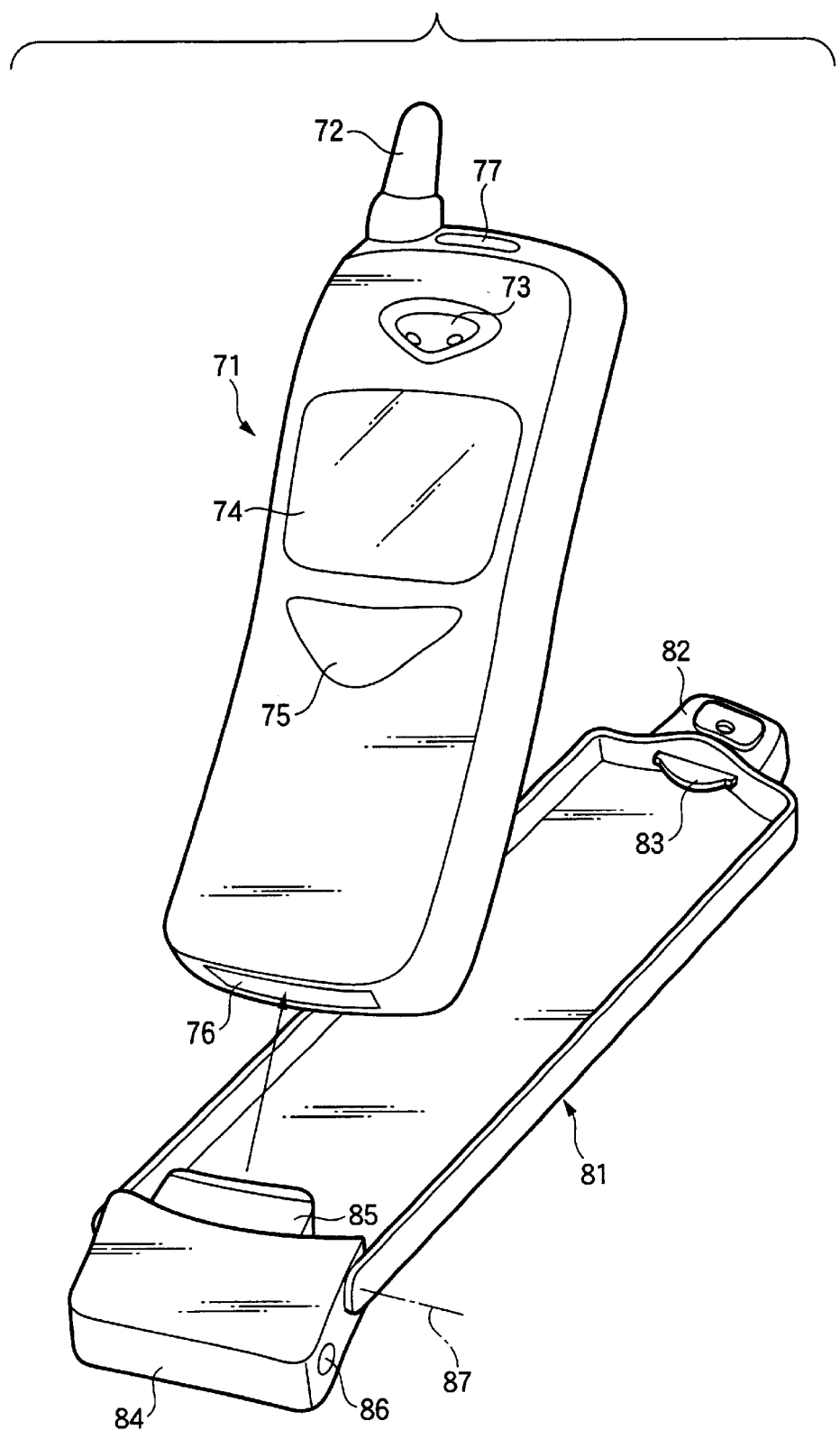
FIG. 7 is a diagram for explaining the configuration of a portable telephone in accordance with a third embodiment of the invention.

FIG. 7 is a diagram for explaining a second embodiment of the invention. This portable telephone 71 has a housing formed in the shape of a substantially flat rectangular parallelopiped in the same way as the second embodiment, an antenna 72 is disposed at its upper left end portion, and a receiver 73, a display unit 74, and an operating key 75 are disposed in that order from the top on the surface of the housing. Further, an external connection terminal 76 is provided on a lower end portion of the housing. Further, this portable telephone 71 has a retaining hole 77 for retaining a holder with a video camera unit 81, which will be described later, is provided on an upper end portion of the housing.

The holder with a video camera unit 81 is formed of an elastomer or the like substantially into a box-shape, and has an external video camera unit 82 at its upper end and an I/O connector unit 84 at its lower end. The I/O connector unit 84 has an I/O connector 85, and the external video camera unit 82 and the I/O connector 85 are electrically connected. A retaining pawl 83 which engages the retaining hole 77 of the portable telephone 71 is provided at an inner upper end of the holder with a video camera unit 81. It should be noted that a headset jack 86 is a terminal for inserting a plug of the headset during hand-free telephone conversation.

In the third embodiment having the above-described configuration, the portable telephone 71 is accommodated in the holder with a video camera unit 81. At this time, the external connection terminal 76 at the lower end of the portable telephone 71 and the I/O connector 85 are connected, and the retaining hole 77 and the retaining pawl 83 at the upper end are engaged. Since the I/O connector unit 84 is swingable about a direction 87 at the lower end face of the holder with a video camera unit 81, the external connection terminal 76 can be easily inserted in the I/O connector 85.

When the portable telephone 71 is set in the holder with a video camera unit 81, the video signal picked up by the external video camera unit 82 is inputted to the portable telephone 71 via the I/O connector 85 and the external connection terminal 76. In addition, the holder with a video camera unit 81 has the function of protecting the portable telephone 71 from a shock and the like. It is preferable to provide an arrangement for making the external video camera unit 82 swingable about the longitudinal direction of the holder with a video camera unit 81, thereby allowing the external video camera unit 82 to pan in the same way as the second embodiment.

As described above, in accordance with this third embodiment, the external video camera unit 82 is connected to the external connection terminal, and the portable telephone 71 can be protected from a shock or the like at the time of connection of the external video camera unit 82.

INDUSTRIAL APPLICABILITY

As described above, there are provided a camera-unit attaching portion capable of selectively attaching or detaching a plurality of video camera units having different specifications; identifying means for identifying the specifications of the video camera unit attached to the camera-unit attaching portion; and controlling means for changing over internal operation in accordance with a result of identification by the identifying means. Accordingly, it is possible to provide a portable information communication terminal apparatus having excellent advantages in that it is possible to selectively attach or detach a plurality of video camera units having different specifications, and that it is possible to change over the internal operation by identifying the specifications of the attached video camera unit.

What is claimed is:

1. A portable information communication terminal apparatus comprising:
   a camera-unit attaching portion capable of selectively attaching or detaching a plurality of video camera units having different specifications;
   identifying means for identifying the specifications of said video camera unit attached to said camera-unit attaching portion; and
   controlling means for changing over internal operation in accordance with a result of identification by said identifying means.

2. The portable information communication terminal apparatus according to claim 1, wherein said plurality of video camera units are a color video camera and a monochromatic video camera, and said controlling means effects changeover between color video signal processing and monochromatic video signal processing.

3. The portable information communication terminal apparatus according to claim 1, wherein said video camera unit is swingable about a direction in which said video camera unit is attached to said camera-unit attaching portion.

4. The portable information communication terminal apparatus according to claim 1, further providing a housing having a structure allowing said housing to be folded by a connecting portion, wherein said camera-unit attaching portion is provided in said connecting portion.

5. The portable information communication terminal apparatus according to claim 1, further providing an external connection terminal, wherein said external connection terminal is used as said camera-unit attaching portion.

6. The portable information communication terminal apparatus according to claim 5, wherein said video camera unit having an input/output connector can be attached to or detached from said connecting portion.

7. The portable information communication terminal apparatus according to claim 5, wherein a housing of said portable information communication terminal apparatus is held by holding means having said video camera unit and an input/output connector unit electrically connected to said video camera.

* * * * *

UNITED STATES PATENT AND TRADEMARK OFFICE
CERTIFICATE OF CORRECTION

PATENT NO. : 6,788,960 B2
DATED : September 7, 2004
INVENTOR(S) : Yutaka Masutani et al.

It is certified that error appears in the above-identified patent and that said Letters Patent is hereby corrected as shown below:

Column 1,
Line 3, please insert the following paragraph:
-- This application claims the benefit of International Application Number WO 01/63925, which was published in English on August 30, 2001. --

Column 4,
Line 3, after "unit", please delete "D" and insert therefor -- 5 --.

Signed and Sealed this

Twenty-fifth Day of January, 2005

JON W. DUDAS
*Director of the United States Patent and Trademark Office*